(12) United States Patent
Elliot et al.

(10) Patent No.: US 11,476,668 B2
(45) Date of Patent: Oct. 18, 2022

(54) ELECTRONIC COMMUTING DEVICE FOR CONTROLLING THE ENERGY CURRENT FLOW IN A WIRE BIDIRECTIONALLY WITHIN AN ELECTRICAL INSTALLATION

(71) Applicant: KLEVERNESS INCORPORATED, Walnut, CA (US)

(72) Inventors: Dan Nurko Elliot, Juárez (MX); Samuel Nurko Yomtow, Huixquilucan (MX)

(73) Assignee: KLEVERNESS INCORPORATED, Walnut, CA (US)

( * ) Notice: Subject to any disclaimer, the term of this patent is extended or adjusted under 35 U.S.C. 154(b) by 182 days.

(21) Appl. No.: 16/952,527

(22) Filed: Nov. 19, 2020

(65) Prior Publication Data
US 2022/0158450 A1    May 19, 2022

(51) Int. Cl.
*H02J 3/00* (2006.01)

(52) U.S. Cl.
CPC ............ *H02J 3/0075* (2020.01); *H02J 3/001* (2020.01)

(58) Field of Classification Search
CPC ................ H02J 3/0075; H02J 3/001

USPC .......................................................... 307/12
See application file for complete search history.

(56) References Cited

U.S. PATENT DOCUMENTS

| | | |
|---|---|---|
| 9,380,685 B2 | 6/2016 | Shet et al. |
| 10,021,765 B1 | 7/2018 | Elliot et al. |
| 10,123,393 B1 | 11/2018 | Soto et al. |
| 10,201,064 B1 | 2/2019 | Soto et al. |
| 10,602,592 B2 | 3/2020 | Elliot et al. |

FOREIGN PATENT DOCUMENTS

CN         2500027 Y         7/2002

*Primary Examiner* — Rexford N Barnie
*Assistant Examiner* — Dru Parries
(74) *Attorney, Agent, or Firm* — Shumaker, Loop & Kendrick, LLP

(57) ABSTRACT

An electronic commuting device for controlling the energy current flow in a wire bidirectionally within an electrical installation, in which the electronic commuting device can be used to supply power from a neutral wire of an electrical installation to a smart home controller device is disclosed, which operates only with a line wire and a load wire, to energize an electrical contact and to supply power to a wireless controller coupled thereto.

18 Claims, 2 Drawing Sheets

ELECTRONIC COMMUTING DEVICE FOR CONTROLLING THE ENERGY CURRENT FLOW IN A WIRE BIDIRECTIONALLY WITHIN AN ELECTRICAL INSTALLATION

TECHNICAL FIELD OF THE INVENTION

The present invention is related to the technical field of automatic smart home lighting control, specifically, relates to an electronic commuting device for controlling the energy current flow in a wire bidirectionally within an electrical installation, said electronic commuting device can be used to supply power from the neutral wire of the electrical installation to a smart home controller device that does not have a neutral wire.

BACKGROUND OF THE INVENTION

In recent years, technological development committed to the automation of homes, buildings, hotels, etc., has been increasing exponentially, allowing different companies to develop and market apparatuses, devices and systems dedicated to this area. This has allowed people to acquire this type of technology at a lower price.

As is known, smart home controller devices generally need three wires to operate, i.e., a line wire (phase) of the alternating current (AC) source that is connected to a terminal of the smart home controller device, a second wire, called a load wire of the lighting device, that is connected to another terminal of the smart home controller device, and a neutral wire of the AC source that is connected to a third terminal of the smart home controller device, that closes the circuit within the smart home controller device, allowing current flow for operation of the smart home controller device electronics.

The above generates a problem for homes already built, since the electrical wiring of said homes has only the first two wires, load wire and line wire (phase), in a switch box or wall box, with the neutral wire absent in the switch box, since the common (non-intelligent) switches or attenuators are connected in series between the AC source and the lighting device. This creates the problem of having to re-wire the entire home in order to bring a neutral wire from the AC source to the switch box.

Due to the above problem, different companies dedicated to this technology are focused on the development of smart home controller devices without the need to use the neutral wire of the electrical installation, allowing its operation with low energy. However, such smart home controller devices, being limited in power, lack many functionalities that are essential when talking about home automation.

Thus, such smart home controller devices that use only the two wires found in the switch box, operate only for switching on and off the one or more lighting devices, due to the small amount of energy they receive, without providing other functions, such as, gradually attenuating the switching on and off of the one or more lighting devices, voice control, camera monitoring system, moisture detection by means of humidity sensors, temperature detection by means of temperature sensors, energy consumption detection by means of electric current measurement sensors, motion detection by means of motion sensors, etc.

An improvement on the described above developments consisted in the development of an electronic commuting device, connected in parallel with the lighting device, which allows to supply power directly from the neutral wire of the electrical installation to the smart home controller device. Said electronic commuting device complies with the above by short circuiting the load wire with the neutral wire of the electrical installation when the lighting device is switched off.

This allows the smart home controller device to be powered directly from the neutral wire of the electrical installation, allowing it to operate with greater energy than previous developments, and thus perform more advanced functions than just turning the lighting devices on and off. That is, perform functions, such as, temperature detection, voice assistance service, camera monitoring system, thermostat control, moisture detection, energy consumption detection, motion detection, etc.

Documents related to electronic commuting devices for smart home control systems were found, where the most relevant document is that of the U.S. Pat. No. 9,380,685B2.

U.S. Pat. No. 9,380,685B2 mentions a device providing a bypass path for the leakage current of a controller that does not use neutral wire. Wherein the device includes a dummy load that will be connected in parallel when the line voltage is low and disconnected when the line voltage is high. Such an invention provides a device having the ability to connect or disconnect a fictitious charge that is switched in parallel with the lighting device to prevent said lighting device from flashing, in this case, light emitting diode (LED) or compact fluorescent lamps (CFL).

However, the bypass path device disclosed in the aforementioned North American Patent does not mention the ability of said device to supply power directly from the neutral wire of the electrical installation by short circuiting the load wire with the neutral wire of the electrical installation.

Documents related to smart home control systems that include smart home controller devices without the use of the neutral wire of the electrical installation were also found, where the most relevant document is that of China Patent CN2500027Y, which mentions a remote control switch without the use of the neutral wire of the electrical installation whose purpose is to work stably and that its operation is not affected by the lighting device and high temperatures.

However, the remote control switch without the use of the neutral wire disclosed in the China Patent mentioned above, does not mention an electronic commuting device capable of supplying power directly from the neutral wire of the electrical installation by short circuiting the load wire with the neutral wire of the electrical installation.

Taking the differences and defects of the prior art into account, it is noteworthy that it fails to disclose or suggest an electronic commuting device, connected in parallel with the lighting device, which allows to supply power directly from the neutral wire of the electrical installation to the smart home controller device. Said electronic commuting device complies with the above by short circuiting the load wire with the neutral wire of the electrical installation when the lighting device is switched off.

SUMMARY OF THE INVENTION

The present invention relates to an electronic commuting device, which, is connected to any lighting device of an electrical installation to supply power to a smart home controller device installed on the home wall that does not use neutral wire. Said smart home controller device comprises a wireless controller that is coupled thereto, as well as an electrical contact for connecting different electronic devices that may or may not be smart.

The electronic commuting device, being in parallel with the turned off lighting device, allows to supply power directly from the neutral wire of the electrical installation to the smart home controller device and thus supply power to the wireless controller and the electrical contact. This is achieved by short circuiting the load wire with the neutral wire of the electrical installation. When the lighting device is switched on, the electronic commuting device does not supply power to the smart home controller device. That is, the smart home controller device is powered by the power of the lighting device.

The electronic commuting device is capable of supplying the maximum current allowed by the electrical installation to the smart home controller device.

BRIEF DESCRIPTION OF THE DRAWINGS

Aspects being considered characteristic of the present invention will be particularly set forth in the appended claims. However, the invention itself, both by its organization and method of operation, together with other elements and advantages thereof, will be better understood in the following description, when read in connection with the accompanying drawings, in which:

DETAILED DESCRIPTION OF THE INVENTION

The present invention discloses an electronic commuting device applied to a smart home controller device that does not use neutral wire, which is connected to any lighting device of an electrical installation, in order to supply power to the smart home controller device installed on the wall. That is, the smart home controller device, thanks to the electronic commuting device, may further work as an electrical contact for connecting different electronic devices that may or may not be smart.

The traditional electrical installation for a switch box does not have the neutral wire but only the line wire (phase) and the load wire, thus the smart home controller device cannot supply enough power to power another electronic device. Common switch boxes only have two wires installed: line and load wires.

This electronic commuting device, being in parallel with the turned off lighting device, allows to supply power directly from the neutral wire of the electrical installation to the smart home controller device. That is, the load wire is short circuited with said neutral wire. When the lighting device is switched on, the electronic commuting device does not supply power to the smart home controller device. That is, the smart home controller device is powered by the power of the lighting device, as disclosed in U.S. Pat. Nos. 10,021,765 B1, 10,602,592 B2, 10,201,064 B1 and 10,123,393 B1, see all documents, belonging to the same Applicant known as KLEVERNESS INCORPORATED.

Thanks to the foregoing, said electronic commuting device allows to supply power to the smart home controller device to activate its functions and further allow it to serve as an electrical contact that powers a variety of electronic devices and/or a variety of smart electronic devices and/or smart home automation systems (hereinafter, any external device).

Figure 1:
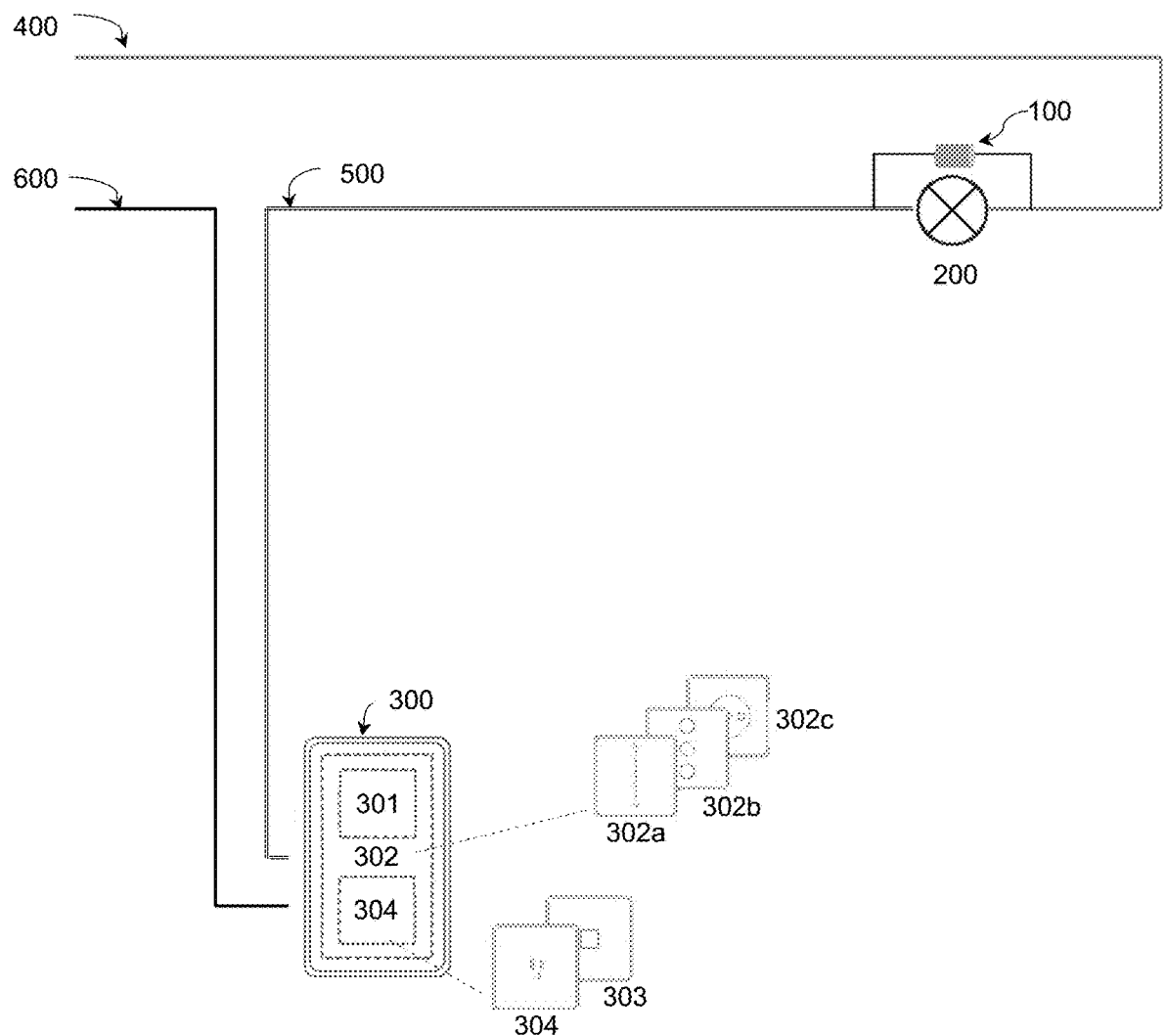
FIG. 1 shows an overview of the connection between the electronic commuting device, the smart home controller device, and the lighting device to the electrical installation.

In detail, FIG. 1 shows a preferred embodiment of the electrical connection between the electronic commuting device 100, the lighting device 200, and the smart home controller device 300. The electronic commuting device 100 is connected in parallel with the lighting device 200, thus, it is connected between the neutral wire 400 and the load wire 500 of the electrical installation. The smart home controller device 300 energizes an electrical contact 304 coupled thereto and allows power supply of a wireless controller 301, without the need to modify the electrical installation of the home. The smart home controller device 300 receives only the line wire 600 and the load wire 500 from the lighting device 200. The fact that it is capable of operating with two wires, allows the smart home controller device 300 to be installed in any existing electrical installation.

Figure 2:
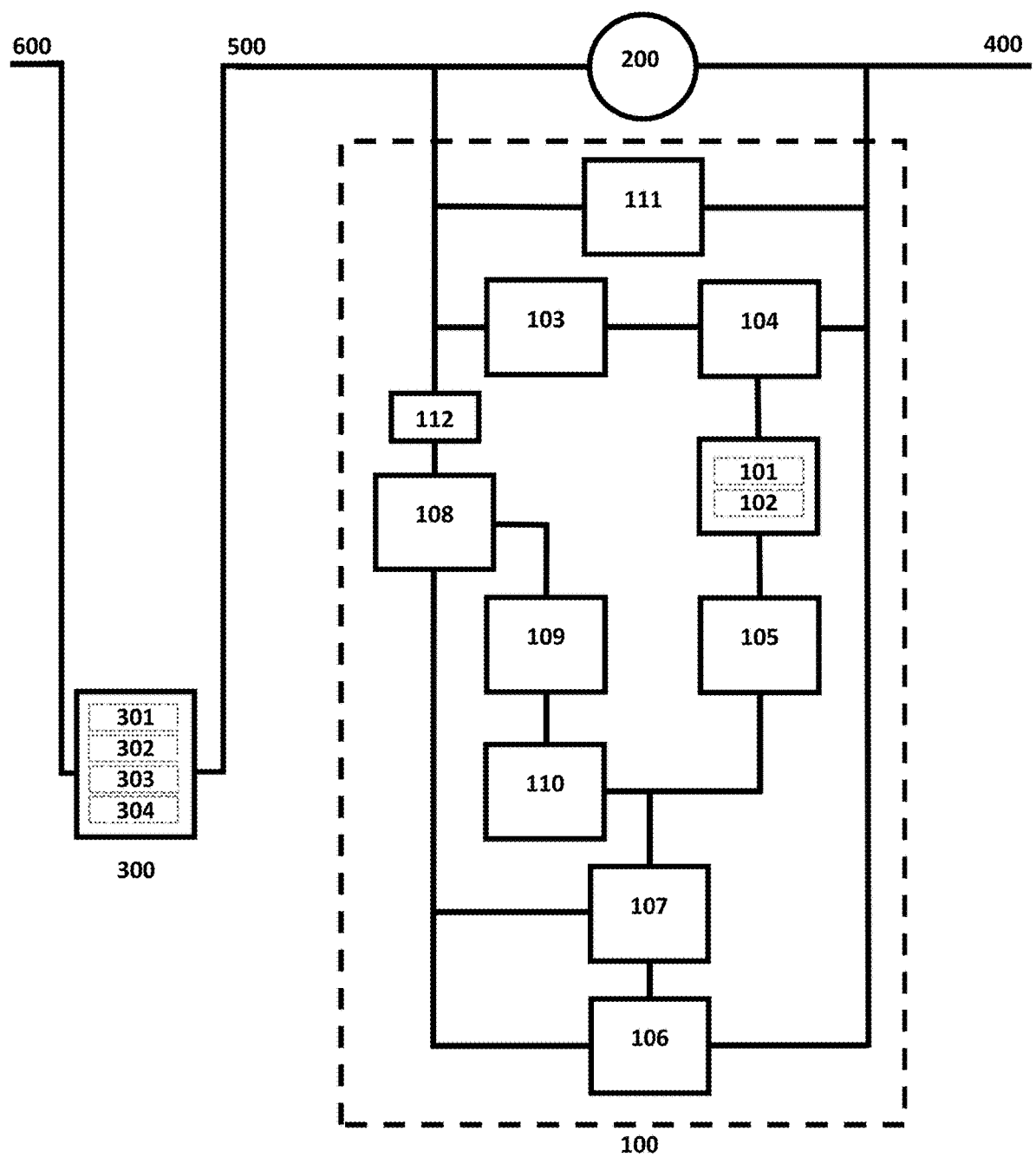
FIG. 2 shows a block diagram of the electronic commuting device.

FIG. 2 shows a preferred embodiment of the electronic circuit of the electronic commuting device 100, as well as its interconnection with the smart home controller device 300. The operation of the electronic commuting device 100 may be found in the following manner:

State 0:

When the electronic commuting device 100 is first installed and the lighting device 200 is turned off, both an energy storage element 101 and an energy storage element 102 are discharged and at the same time, a switching element 106 is normally open.

State 1:

When the user changes the state of the lighting device 200 from off to on and while it remains on, the voltage signal of the lighting device 200 is filtered by a signal conditioning element 103 connected in series with a rectifier element 104 rectifying the same. Said resulting voltage signal, supplies energy, charging the energy storage elements 101 and 102, resulting in comparison voltage signal $V_{DC}$ and reference $V_{REF}$ successively. Said $V_{DC}$ and $V_{REF}$ signals are compared by an inverter comparator 105, wherein said inverter comparator 105 provides an output voltage signal $V_{OUT}=0$. Thus, the switching element 106 remains normally open.

It is note that, during this state, the smart home controller device 300 is powered by the power of the lighting device 200, as described above.

State 2:

At the instant the user changes the on to off state of the lighting device 200, the energy storage element 102 is discharged immediately, resulting in a reference voltage signal $V_{REF}=0$; while the energy storage element 101 is kept charged for a certain time and is subsequently gradually discharged. During said determined time, the energy storage element 101 provides a comparison voltage signal $V_{DC}$, the same being compared, by means of the inverter comparator 105, with the reference voltage signal $V_{REF}=0$, wherein said inverter comparator 105 provides an output voltage signal $V_{OUT}$. Thus, it activates an isolating switching element 107, such as those known in the prior art, which separates the control stage from the power stage. This allows the switching element 106 to close its terminals to join the neutral wire 400 and the load wire 500 of the electrical installation. During that same determined time and prior to the total discharge of the energy storage element 101, the smart home controller device 300 activates the load circuit of the smart home controller device 300 for supplying power to the wireless controller 301 and/or an external device 303 on the electrical contact 304, allowing current flow through a power transmission element 108 that converts the rated voltage signal to a lower voltage signal, which is rectified through a rectifier element 109 and filtered by means of a signal conditioning element 110. During this state, the switching element 106 is kept closed by the output voltage signal $V_{OUT}$ of the inverter comparator 105.

State 3:

When the lighting device 200 remains in the off state and the energy storage element 101 is discharged completely, the inverter comparator 105 sends an output voltage signal $V_{OUT}=0$, however, the switching element 106 remains closed thanks to the rectified voltage signal coming from the power transmission element 108.

It should be note that, current flow through the power transmission element 108 will continue, closing the switching element 106 indefinitely, as long as the wireless controller 301 is coupled to the smart home controller device 300 for its power supply and/or some external device 303 that demands energy to the electrical contact 304 is connected.

During state 2 and 3, the electronic commuting device 100 allows to supply power directly from the neutral wire of the electrical installation to the smart home controller device 300.

State 4:

At the time the user changes the off to on state of the lighting device 200, the smart home controller device 300 deactivates the load circuit of the smart home controller device 300, disabling the power supply to the external device 303 and/or the wireless controller 301 and/or the electrical contact 304 and, consequently, disabling the current flow through the power transmission element 108. This allows the switching element 106 to open its terminals to separate the neutral wire 400 and the load wire 500 from the electrical installation.

After state 4, the lighting device 200 returns to the on state, as explained in state 1.

No Energy Demand State:

When the lighting device 200 is off, the energy storage elements 101 and 102 are discharged, there was no current flow demand through the power transmission element 108 and the user decides to couple the wireless controller 301 and/or connect the external device 303 to the electrical contact 304 for power supply; the smart home controller device 300 sends a minimum voltage signal, for an instant, through the load wire 500. This allows the electronic commuting device 100 to comply with what is disclosed in states 1, 2, 3 and 4 and, thus, activating the load circuit, of the smart home controller device 300 for supplying power to the wireless controller 301 and/or an external device 303 on the electrical contact 304. It is necessary to note that said minimum voltage signal is not capable of switching on the lighting device 200.

In a preferred embodiment, the electronic commuting device 100 further comprises a snubber adapter 111. That is, an energy storage element, capacitor, resistance, or even an intelligent snubber circuit, which already exists in the prior art, such as that disclosed in U.S. Pat. No. 10,021,765 B1, column 3, lines 10 to 26, belonging to the same Applicant known as KLEVERNESS INCORPORATED.

In a preferred embodiment, the load circuit of the smart home controller device 300, is capable of powering an external device 303 and the wireless controller 301 in any state of the lighting device 200. That is, the user is capable of connecting an external device 303, for power supply, regardless of whether the lighting device 200 is in the off or on state.

It should be noted that, when the lighting device 200 is in the on state, the smart home controller device 300 is powered by the power of said lighting device 200 and, if necessary, is also powered by the power stored in the snubber adapter 111. That is, when the user connects the wireless controller 301 and/or connects the external device 303 to the electrical contact 304 for power supply, the energy demand of the smart home controller device 300 will be higher, where it will be powered not only by the energy of said lighting device 200 but also by the snubber adapter 111.

It is also necessary to note that, when the lighting device 200 is in the off state, the electronic commuting device 100 is capable of supplying the maximum current allowed by the electrical installation to the smart home controller device 300.

It is important to note that, by attaching the neutral wire 400 and the load wire 500, it allows to have the energy supply directly from the electrical installation. That is, thanks to the electronic commuting device 100, the smart home controller device 300 works as an electrical contact 304, allowing the power supply of any external device 303 and the power thereof.

It is of utmost importance to note that the electronic commuting device 100, being in parallel with the lighting device 200, allows that when the lighting device 200 is on, the load wire 500 is located as electrical current output from the smart home controller device 300. When the lighting device 200 is switched off, the load wire 500 is short circuited with the neutral wire of the electrical installation (as mentioned above), i.e., the load wire 500 is switched from electrical current output to input towards the smart home controller device 300. Thus, the load wire 500 is a bidirectional wire that allows the input or output of electrical current depending on the state of the lighting device 200.

Similarly, it is of utmost importance to note that the power supply of the electronic commuting device 100 is limited by the electrical installation of the home. That is, when the load wire 500 is short circuited with said neutral wire 400, thanks to the electronic commuting device 100, said electronic commuting device 100 can supply the maximum current allowed by the electrical installation.

In a preferred embodiment, the electronic commuting device 100 comprises one safety element 112, which is not limited to being only one element, but can be more than one, wherein said safety element is a fuse.

In a preferred embodiment, the energy storage elements 101, 102 are not limited to being only two elements, but can be limited to only one or they can be more than two, wherein said energy storage elements are capacitors.

In a preferred embodiment, the switching element 106 is not limited to being only one element, but can be more than one, wherein said switching element is a triac.

In a preferred embodiment, the signal conditioning elements 103, 110 are not limited to being only two elements, but can be limited to only one or can be more than two, wherein said signal conditioning elements are signal filters.

In a preferred embodiment, the rectifying elements 104, 109 are not limited to being only two elements, but can be limited to only one or can be more than two, wherein said rectifying elements are diode bridges.

In a preferred embodiment, the isolating switching element 107 is not limited to being only one element, but can be more than one, wherein said isolating switching element is an optocoupler.

In a preferred embodiment, the power transmission element 108 is not limited to being only one element, but can be more than one, wherein said power transmission element is a transformer.

In a preferred embodiment, the comparator element 105 is not limited to being only one element, but can be more than one, wherein said comparator element is an operational amplifier.

In a preferred embodiment, the smart home controller device 300 comprises a user interface 302, which is responsible for receiving actions from the user to control the switching on or off, intensity, or attenuation of the lighting device 200. Said user interface 302 comprises a touch interface (302a, 302b, 302c) and user actions comprise touch gestures; the user interface 302 may also comprise LEDs and a horn or buzzer to provide information to the user about the state of the smart home controller device 300. The smart home controller device 300 comprises LED indicators that are activated depending on the number of lighting devices 200 connected to the electrical installation. In a secondary embodiment, the user interface 302 may comprise a voice-operated interface; and in another secondary embodiment, the user interface 302 may be a three-dimensional touch interface controlled by user touch and proximity gestures. In a further secondary embodiment, the smart home controller device 300 may be restored to its factory configuration by a predetermined gesture on the touch interface 302.

In addition to the foregoing and in a preferred embodiment, the smart home controller device 300 comprises the wireless controller 301, which, is coupled thereto by magnetic means and/or fasteners. The smart home controller device 300 supplies power to the wireless controller 301 in a continuously and controlled manner in order to supply power to its battery. The power supply to the battery of the wireless controller 301 may be via wireless or contact-based power transmission, such as with electrical connectors.

In a secondary embodiment, the smart home controller device 300 is capable of using another type of wireless controller existing in the prior art, such as, button panels, LCD touch screens, and external waterproof controllers.

The wireless controller 301 may run third-party applications such as Apple HomeKit™, Amazon Alexa™, or Google Assistant™ and display real-time information from different sources, for example, receive weather information, stock market information, and news information that may be displayed on the user's wall, or even play music.

In a secondary embodiment, the wireless controller display 301 includes a high fidelity microphone, which may be used as a means of making video calls over the home or even over the Internet. It can also be used as an intercom to manage communication within the home.

In a preferred embodiment, the wireless controller 301 may be used as a video gatekeeper, wherein a real-time image may be displayed at the entrance to the home from a surveillance camera contained in the wireless controller 301. In a preferred embodiment, users will receive a notification, on their mobile phone and/or another wireless controller 301 of the home, indicating that someone has rang the bell of the smart home. In addition, wireless controllers 301 may be used as a closed-circuit television due to their surveillance cameras, as all wireless controllers 301 operate as an internal security system. The user, via an application, may select and view real-time images of the surveillance cameras contained in each wireless controller 301 within the smart home. In a secondary embodiment, by using wireless controllers 301 as an internal security system, these may be used to monitor infants and/or minor children.

In a secondary embodiment, the internal security system may wirelessly communicate with the communication systems of the urbanization security guards.

The wireless controller 301 may also be used to enhance security with surveillance within a room by using the camera as a security camera, as they may transmit the image in real time to any device connected to the Internet.

In addition, the high-fidelity microphone is powered on hours a day to provide the user with voice assistance. That is, the controller has built-in voice systems such as Amazon Alexa™, Google Home™, or any other voice system that enables such service to be provided. It should be mentioned that the wireless controllers 102 may also contain a motion sensor, humidity sensor, temperature sensor, in order to use this information to make the intelligent home ecosystem smarter without using a neutral wire, thereby allowing the installation of these sensors in a greater number of locations.

In a secondary embodiment, the temperature sensor operates not only for the wireless controller 301 to indicate the detected temperature, but also for the wireless controller 301 to work as an intelligent thermostat. That is, the wireless controller 301 may run third-party home automation applications that control air conditioners and heating. Such third-party home automation applications may be NEST™, Ecobee™ or any other application dedicated to the control of air conditioners and heating.

The aforementioned smart home controller device 300 is disclosed in U.S. Pat. Nos. 10,021,765 B1 and 10,602,592 B2, all documents, belonging to the same Applicant known as KLEVERNESS INCORPORATED. That is, it contains the same technical features disclosed in the foregoing patents except for the technical feature that the smart home controller device 300 works as an electrical contact 304 that powers a variety of electronic devices and/or a variety of smart electronic devices and/or smart home automation systems (hereinafter, any external device 303).

Similarly, the aforementioned wireless controller 301 is disclosed in U.S. Pat. No. 10,602,592 B2, the entire document, belonging to the same Applicant known as KLEVERNESS INCORPORATED. That is, it contains the same technical characteristics disclosed in the previous patent.

It should be understood that the foregoing description is illustrative of the invention and should not be construed as a limitation on the invention. Those skilled in the art may create various modifications and applications without being isolated from the true spirit and scope of the invention. Thus, the electronic commuting device 100 of the present invention, is presented as a remarkable novelty within its field of application, and with the same the aforementioned objective is substantially achieved, showing all the details that characterize it in each of the final claims that accompany the present invention.

The invention claimed is:

1. An electronic commuting device, supplying power from a neutral wire of an electrical installation to a smart home controller device that operates only with a line wire and a load wire, to energize an electrical contact and to supply power to a wireless controller coupled thereto, the electronic commuting device comprising:
   at least two energy storage elements;
   at least one comparator comparing the signals of said at least two energy storage elements;
   at least one switching element; and
   at least one power transmission element;
   wherein said at least one switching element is closed to attach the neutral wire of the electrical installation to the load wire, for power supply, when a user changes the state of a lighting device from on to off and only when said lighting device remains off and an external device is connected to the electrical contact and/or the wireless controller is coupled to the smart home controller device; and wherein said at least one switching element remains open when the lighting device is switched off and the external device is disconnected from the electrical contact and the wireless controller is decoupled from the smart home controller device.

2. The electronic commuting device according to claim 1, wherein said at least one switching element remains open when the lighting device is switched on.

3. The electronic commuting device according to claim 1, wherein it is capable of receiving a minimum voltage signal sent from the smart home controller device, so that said at least one switching element is closed and the neutral wire of the electrical installation is connected with the load wire, allowing power supply.

4. The electronic commuting device according to claim 3, wherein the minimum voltage signal sent from the smart home controller device is received, when the lighting device remains off and the user connects an external device to the electrical contact and/or couples the wireless controller device to the smart home controller device.

5. The electronic commuting device according to claim 2, wherein, when the lighting device is in the on state, said at least one switching element remains open allowing the smart home controller device to be powered by the power of said lighting device.

6. The electronic commuting device according to claim 5, further comprising a snubber adapter that stores energy and that allows to power the smart home controller device, when the lighting device is in the on state.

7. The electronic commuting device according to claim 1, wherein it is capable of powering the smart home controller device in any state of the lighting device so that it, in turn, powers the external device and/or the wireless controller.

8. The electronic commuting device according to claim 7, wherein the power to the smart home controller device is greater when the lighting device is switched off.

9. The electronic commuting device according to claim 1, wherein it allows the load wire to work as a bidirectional wire that allows the input or output of electrical current depending on the state of the lighting device.

10. The electronic commuting device according to claim 1, wherein the power supply of the electronic commuting device is limited by the electrical installation of the home.

11. The electronic commuting device according to claim 1, wherein said at least two energy storage elements are capacitors.

12. The electronic commuting device according to claim 1, wherein said at least one comparator is an operational amplifier.

13. The electronic commuting device according to claim 1, wherein said at least one switching element is normally open.

14. The electronic commuting device according to claim 1, wherein said at least one switching element is a triac.

15. The electronic commuting device according to claim 1, wherein said at least one power transmission element is a transformer.

16. The electronic commuting device according to claim 1, further comprising at least one safety element.

17. The electronic commuting device according to claim 16, wherein said at least one safety element is a fuse.

18. The electronic commuting device according to claim 1, wherein it allows the load wire to work as a bidirectional wire that allows the input or output of electrical current depending on the state of the lighting device.

\* \* \* \* \*